Patented Oct. 21, 1930

1,779,273

UNITED STATES PATENT OFFICE

OSCAR HOMMEL, OF PITTSBURGH, PENNSYLVANIA

ART OF MAKING ENAMEL WARE

No Drawing.  Application filed April 26, 1928. Serial No. 273,157.

My invention relates to improvements in the art of coating metallic atricles, and specifically articles of iron and steel, with a fused and vitreous enamel.

In the practice of my invention, and beginning with the properly prepared article of ferrous metal, ordinarily of iron or steel—a steel wash basin, for example,—I see to it that the surface is by known means freed of substances accidentally present—the grease for example which may remain, consequent upon a pressing or spinning operation—and otherwise cleaned. I then cause a film of oxide of another metal of the iron group, of cobalt, nickel, manganese, or a film of combined oxides of such other metals, or of any two of them to form upon the surface of the article. The film may be formed in a variety of ways. For example, the article may be heated to red heat and while at that temperature a solution of a salt of the desired metal may be sprayed upon it,—an aqueous solution, for example, of carbonate of cobalt, or of the nitrate. The heat to which the sprayed on material is thus subjected has two effects: the driving off of the solvent and the reduction of the salt from the more complex carbonate or nitrate to the oxide, and the oxide so produced together with inevitably formed oxide of iron forms a coating or film upon the surface of the article.

Alternatively, instead of spraying the solution upon the article when heated, the article may be immersed in the solution,—preferably a saturated solution. Being removed from such immersion the article is coated with the solution and, after drying, it continues to be coated with the precipitated salt in the form of an incrustation. The coated article then is heated, and as a temperature of from 1000° to 1400° F. is approached the reduction of the salt will occur and the film of oxide will form, with substantially the same result as in the procedure first described.

To the surface coated with such film of oxide, the enamel is applied, and vitrified in usual manner. For instance, the article may be dipped in a slip of enamel, dried, and fired. The enamel coating of such ware is ordinarily completed with two or more applications of enamel and with firings following the two repeated applications. It has hitherto been known that if in the first of the slips in which the article is dipped such metallic oxides as I have indicated be present, the enamel coating is more securely united upon the steel surface. I have found that, proceeding in the manner described, I obtain still better adhesion of the coating to the steel, and I have found that, while a second coating step may be taken, it no longer is essential to a successful job, and that by one application of enamel to the oxide filmed steel a good and serviceable enameling may be accomplished.

A known alternative method of applying the enamel is by sifting the finely ground enameling substance, essentially glass, upon the article when heated to 1800° F. or thereabouts. If the article be prepared with the film coating of metallic oxide, as I have described, the adhesion of the enamel coating applied by sifting will be found to be greatly improved.

I claim as my invention:

1. In the manufacture of enamel ware having a body of metal and a surface coating of vitreous nature the procedure herein described which consists in coating the surface of a body of a ferrous metal with a film of oxide of another metal selected from a group consisting of cobalt, nickel, and manganese, and forming the enamel coating upon the surface so prepared.

2. In the manufacture of enamel ware having a body of metal and a surface coating of vitreous nature the procedure herein decribed which consists in coating the surface of a body of iron or steel with a film of metallic oxide including the oxide of cobalt, and forming the enamel coating upon the surface so prepared.

3. In the manufacture of enamel ware having a body of metal and a surface coating of vitreous nature the procedure herein described which consists in coating the surface of a body of a ferrous metal with a film of metallic oxide from inorganic compounds selected from a group of metals consisting of cobalt, nickel, and manganese, and forming upon the film-covered surface a coating of enamel.

4. In the manufacture of enamel ware the procedure herein described which consists in coating the surface of a body of iron or steel with carbonate of cobalt, reducing the coating to a film of oxide upon the surface, and forming upon the film covered surface a coating of enamel.

In testimony whereof I have hereunto set my hand.

OSCAR HOMMEL.